Jan. 6, 1925.                                               1,521,773
C. E. JOHNSON
DRYING AND STORAGE APPARATUS
Filed April 20, 1921          2 Sheets-Sheet 2
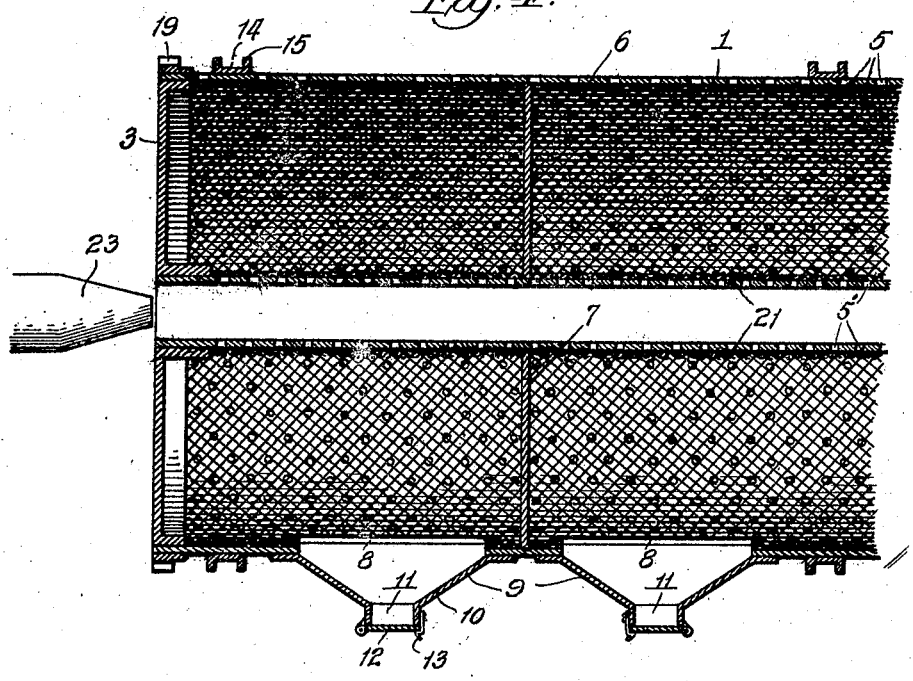
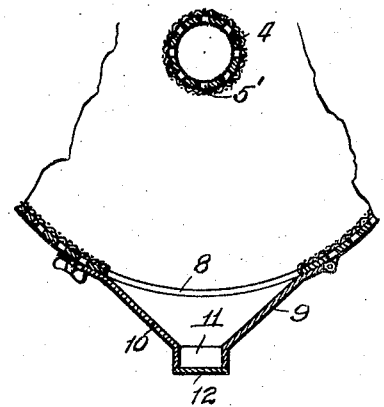
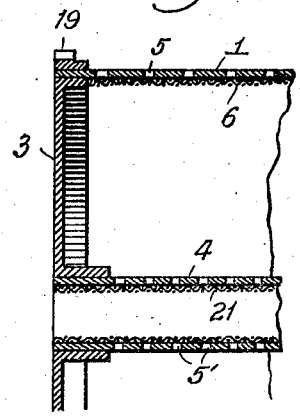
Witness:
John Enders
Inventor:
Charles E. Johnson,
by Wallace R. Lane.
Atty.

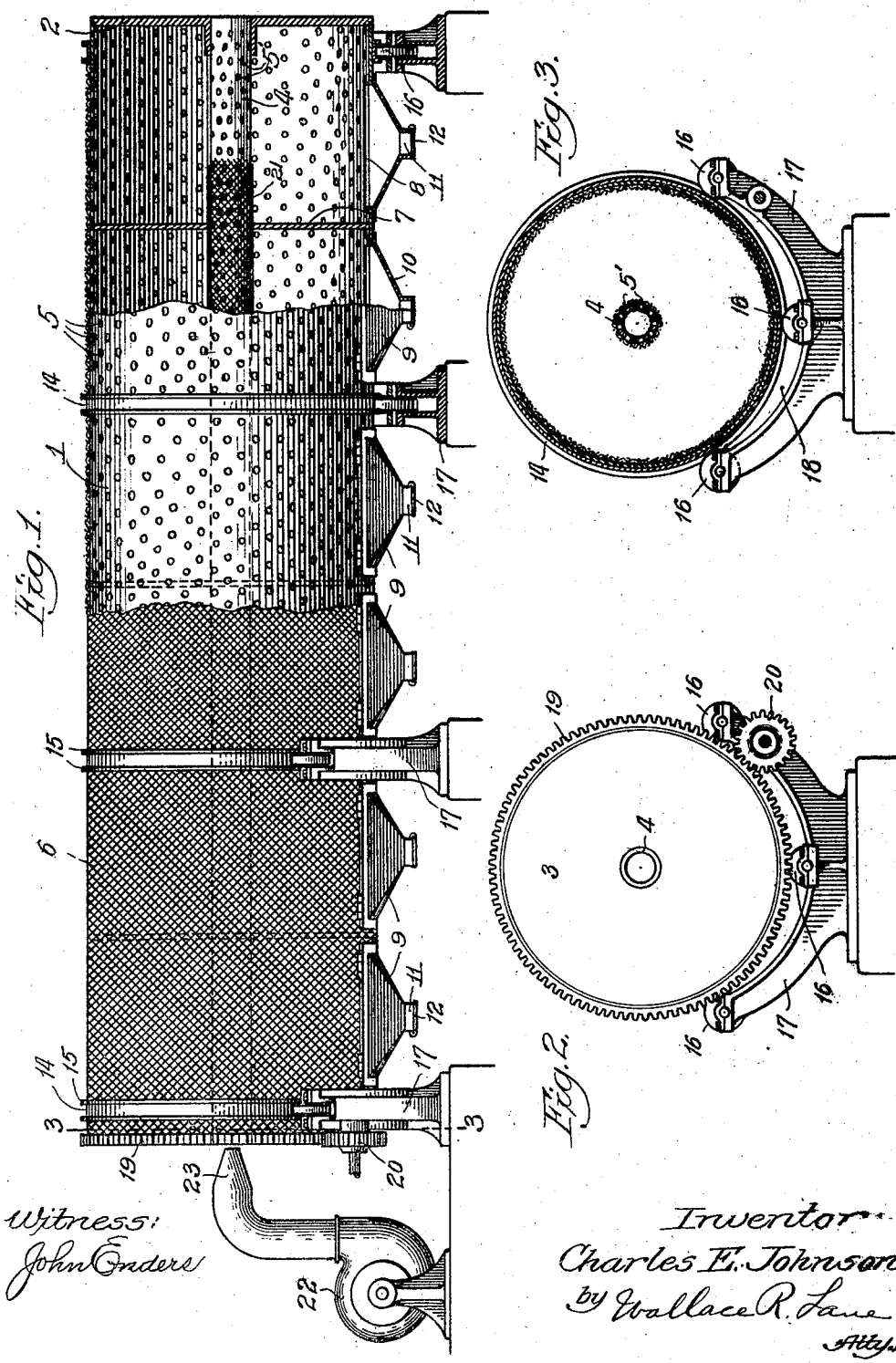

Patented Jan. 6, 1925.

1,521,773

UNITED STATES PATENT OFFICE.

CHARLES E. JOHNSON, OF WAUPUN, WISCONSIN, ASSIGNOR, BY DIRECT AND MESNE ASSIGNMENTS, OF ONE-HALF TO J. P. KARNS, OF JOHNSTOWN, PENNSYLVANIA, AND ONE-HALF TO ALEXANDER POPE, OF EVANSTON, ILLINOIS.

DRYING AND STORAGE APPARATUS.

Application filed April 20, 1921. Serial No. 462,950.

*To all whom it may concern:*

Be it known that I, CHARLES E. JOHNSON residing at Waupun, in the county of Fond du Lac and State of Wisconsin, have invented a certain new and useful Improvement in Drying and Storage Apparatus, of which the following is a specification.

This invention relates to a receptacle, stationary or rotatable, provided with means for introducing fresh air into and through the contents for storing, drying and curing grains, vegetables, fruits and other products in a sanitary, economical and efficient manner.

Among the many objects of my invention may be specifically mentioned the following:—

To provide a receptacle where fresh air will be introduced into the contents both from the perforated outer wall or walls and simultaneously by a perforated tube or passageway extending through the center of the receptacle. The supply of fresh air may be either the natural supply incident to such a structure or forced, in which latter case any well known blower mechanism may be used; a storage tank perfectly sanitary and free from the invasion of mice and other vermin so prevalent in and around places where grains and like food products are usually stored; to secure perfect cleanliness in the storage of food products not obtainable where grains and the like are stored in open and old fashioned bins and granaries; to provide a rotatable bin or granary wherein grains and like food products are thoroughly dried and cured, thus avoiding molding and spoilage so common where the old fashioned bins and granaries are used, saving large quantities of grains and like food products from spoiling on account of excessive moisture and insufficient and improper drying, curing and storage; to provide suitable and simple means for rotating my device for introducing air into and stirring the contents thereof so as to secure the most perfect curing and drying; further to secure economy in both the original construction and installation as well as in upkeep, maintenance and durability; to secure a receptacle capable of construction with a plurality of bins or compartments if desired for different kinds of cereals or other food products, for simultaneous drying and storage; to secure a higher and better grading of grains and other food products with attendant better prices therefor; to increase the quality of grains and other food products; to secure a means for drying and storing grains and other food products in a sanitary, cleanly and proper manner for such special purposes as milling, breakfast food manufacturers and like purposes; further to secure a drying and storing bin or granary which may be used for transportation purposes by rail or water; to secure a drying and storage bin or granary wherein the grains and other food products may be both put into and taken out of same readily and economically with means for attaching weighing or measuring mechanism or devices; to secure a thorough agitation of, and permeation of air through the grains or other food products so as to avoid heating and explosions, due to formation of gases, and spontaneous combustion; and such further objects, advantages, and capabilities as will later more fully appear.

My invention further resides in the combination, construction and arrangement of parts illustrated in the accompanying drawings, and while I have shown therein a preferred embodiment, I wish it to be understood that the same is susceptible of modification and change without departing from the spirit of my invention.

In the drawings:—

Fig. 1 is a side elevation, partly in section, of my improved drying and storage apparatus.

Fig. 2 is an end elevation looking toward the left hand end of Fig. 1, and omitting the blower.

Fig. 3 is a section on line 3—3 of Fig. 1, but showing the screen on the inside of the perforated wall of the drum.

Fig. 4 is an enlarged fragmentary vertical section through the central plane of Fig. 3, omitting the base members.

Fig. 5 is a fragmentary transverse sectional view through one of the hoppers and adjacent parts.

Fig. 6 is a fragmentary sectional view of a portion of one end of the storage receptacle, shown in Fig. 3, but showing the screen applied to the inner face of tubular pipe 4 instead of the outside as in the preceding views.

Referring to the drawings, and more particularly to Fig. 1, my improved drying and storage apparatus will be seen to consist of the elongated, preferably cylindrical, tank or receptacle 1, having end portions 2 and 3, each provided with a central opening in which the respective ends of the tubular pipe or conduit 4 is secured. The outer wall of drum 1 is formed with a large number of perforations 5, and the tubular pipe or conduit 4 is formed throughout its length with a plurality of perforations 5'. The perforations in drum 1 are covered by a fine mesh netting or screen 6, of metal or other suitable material, placed preferably upon the interior of said drum as shown in Figs. 3, 4, 5 and 6, but which may be placed on the exterior, as shown in Fig. 1, if desired. Spaced along the length of arm 1, and extending between the exterior of pipe 4 and the interior of the drum outer walls, are a plurality of lateral partitions 7, dividing the interior of the drum into a plurality of compartments, each of which is formed with an opening 8, to the adjacent walls of which are secured hoppers 9, having outwardly inclined walls 10 and spout 11, the latter of which is covered by suitable closure, such as door 12, releasably held closed by spring catch 13, or other suitable means. This hopper serves as means for filling the various compartments when turned to the upper side of the drum, and for means through which the contents of the compartment may be discharged when the hopper or chute is turned to the lower side of the drum. Suitable weighing or measuring devices may be readily attached or associated, as desired, to the hopper outlet for weighing or measuring the amount of the material being withdrawn from the compartments.

Spaced at suitable intervals throughout the length of drum 1, and secured to the exterior thereof, are trackways 14, which preferably are provided with flanges 15 to retain the same in engagement with rollers 16, as shown in Figs. 1 and 3. Rollers 16 are mounted in suitable bearings in base members 17, and are spaced a substantial distance apart laterally of the drum 1, which fact, together with the positioning of the central one of the three rollers on each base portion considerably lower than the two outer rollers, will permit the drum 1 to extend downwardly into the concavity 18 of base members 17 to insure stability of the drum and prevent tendency of the same to leave the rollers in a high wind, or because of other disturbances. If desired, further means of any desired form, as for example, a strap passing around and loosely fitting within guideways 14 and secured at its ends to base member 17, may be provided in localities where extremely high wind pressures, or the like, are to be expected, or when the storage apparatus is mounted on a car for transportation.

Suitably secured to one end of drum 1, and externally thereof, or otherwise, as desired, is a gear 19, meshing with which is driving pinion 20, suitably operated by a windlass, power shaft, or the like, to rotate the drum as desired. While for the sake of illustration I have shown only one gear 19, it will be readily understood that others may be suitably geared at spaced intervals along the drum, as desired, to be simultaneously operated from a power shaft, or otherwise, as occasion may dictate.

There is also applied a fine mesh screen or netting 21, to conduit 4, preferably on the exterior thereof, but which as shown in Fig. 6 may be on the interior if desired. These fine mesh nettings applied to drums 1, and conduit 4, as will be readily understood, will permit the free and ready circulation of air through perforations 5 and 5' of the walls of the drums, and the tubular pipe 4, respectively, but will prevent the escape through the perforations of grain or other food materials being stored, as well as prevent the entry within the drum compartment of insects, mice, or the like; thus insuring that the contents of the drum compartments will be readily and quickly dried by the air passing therethrough at all times, and maintained in a sanitary and clean condition.

It is to be noted that the ends of conduit 4 are open to the outside air, thus permitting free circulation of air into the conduits, through its perforations and through the drum compartments. If desired, this circulation of air may be accelerated by the use of any suitable means for impelling air under force through the conduit. One form of such means I have illustrated in Fig. 1, as a blower 22, the outlet or nozzle 23 of which is directed into the open end of tubular pipe 4.

As will be readily understood, the contents of the various compartments of drum 1, may be readily and easily stirred by rotating the drum, and simultaneously with which action, a current of air through the stored material will be maintained to cure and dry the contents, and maintain the same in such dry state for an indefinite period of time to cure the material being stored, as well as to insure its storage without deterioration. This free circulation of air through the contents of the bin will also avoid undue heating of the same and explosion due to the formation and collection of gases and spontaneous combustion.

I also contemplate the mounting of my improved storage apparatus on railroad cars, boats, and the like, for transportation purposes, and in such cases the base members 17 may form portions of the frame work of such car or boat. Fig. 1 will therefore be understood as representing my device mounted either upon the ground or other stationary support, or upon a railroad car, boat, or the like, the wheels of the car being omitted to conserve space. As will be readily understood this feature of mounting my device on railroad cars will greatly facilitate the shipping of grain and the like over the country in a dry, safe, and sanitary manner, and greatly simplify the handling of the same in many ways, including ease of loading and unloading.

Having now described my invention, I claim:—

1. A drying and storage apparatus comprising a receptacle having inner and outer walls forming a storage and drying chamber between said walls, said outer wall having an opening in the side thereof, and a hopper carried by said outer wall at said opening and operating to permit entry of grain into said chamber when in one position and discharge of grain from said chamber when in another position.

2. A drying and storage apparatus comprising a receptacle having a conduit passing therethrough, the walls of said receptacle and conduit being perforated to permit the passage of air therethrough, and fine mesh netting material positioned over said perforations to prevent the escape of contained material from and the entry of insects or the like to the interior of the receptacle.

3. A drying and storage apparatus comprising a rotatably mounted receptacle having a conduit passing therethrough, the ends of said receptacle and conduit being free from trunnions or the like, said conduit and the outer wall or walls of said receptacle being perforated to permit the free passage of air into and out of the receptacle while in use to prevent deterioration of its contents while being stored for long or short periods.

4. A drying and storage apparatus comprising a rotatably mounted receptacle having a conduit passing therethrough, the ends of said receptacle and conduit being free from trunnions or the like, said conduit and the outer wall or walls of said receptacle being perforated to permit the free passage of air into and out of the receptacle while in use to prevent deterioration of its contents while being stored for long or short periods, spaced trackways secured to the exterior of said receptacle, and base members carrying rollers engaging said trackways to rollably support said receptacle.

5. A drying and storage apparatus comprising a rotatably mounted receptacle having a conduit passing therethrough, the ends of said receptacle and conduit being free from trunnions or the like, said conduit and the outer wall or walls of said receptacle being perforated to permit the free passage of air into and out of the receptacle while in use to prevent deterioration of its contents while being stored for long or short periods, spaced trackways secured to the exterior of said receptacle, and a plurality of series of rollers respectively engaging said trackways, the rollers of each series being spaced apart laterally of the receptacle so that the receptacle will be rollably held on said rollers.

6. A drying and storage apparatus comprising a rotatably mounted receptacle having a conduit passing therethrough, the ends of said receptacle and conduit being free from trunnions or the like, said conduit and the outer wall or walls of said receptacle being perforated to permit the free passage of air into and out of the receptacle while in use to prevent deterioration of its contents while being stored for long or short periods, spaced trackways secured to the exterior of said receptacle, and a plurality of series of rollers respectively engaging said trackways, the rollers of each series being spaced apart laterally of the receptacle so that the receptacle will be rollably held on said rollers, and means for rolling said receptacle any desired amount on said rollers.

7. A drying and storage apparatus comprising a rotatably mounted receptacle having a conduit passing therethrough, the ends of said receptacle and conduit being free from trunnions or the like, said conduit and the outer wall or walls of said receptacle being perforated to permit the free passage of air into and out of the receptacle while in use to prevent deterioration of its contents while being stored for long or short periods, and means for forcing a current of air through said conduit.

8. A drying and storage apparatus comprising a rotatably mounted receptacle having a conduit passing therethrough, the ends of said receptacle and conduit being free from trunnions or the like, said conduit and the outer wall or walls of said receptacle being perforated to permit the free passage of air into and out of the receptacle while in use to prevent deterioration of its contents while being stored for long or short periods, lateral partitions in said receptacle to divide the same into compartments, and a hopper secured to each compartment to serve as a filling means when rolled to the top, and as a discharging means when rolled to the bottom.

9. A drying and storage apparatus comprising a rotatably mounted receptacle having a conduit passing therethrough, the ends of said receptacle and conduit being free from trunnions or the like, said conduit and the outer wall or walls of said receptacle being perforated to permit the free passage of air into and out of the receptacle while in use to prevent deterioration of its contents while being stored for long or short periods, spaced trackways secured to the exterior of said receptacle, and base members carrying rollers engaging said trackways to rollably support said receptacle, each base member having a concavity on its upper side, and spaced rollers on said base members engaging said trackways to rollably support said receptacle with its lower side extending into said concavity.

10. In apparatus of the class described a perforated rotatably mounted receptacle having a perforated tubular pipe passing therethrough and secured co-axially in the end walls thereof respectively, the ends of said pipe extending through said receptacle ends and being in open communication with the ambient air, the receptacle ends and tubular pipe being free of any trunnions or the like, and means for rollably mounting said receptacle to permit it to be rolled as desired to give access of air to all parts of the material being stored to enable the same to be stored for long periods without deterioration.

11. A drying and storage apparatus for grain and the like comprising an elongated cylindrical perforated drum having a perforated tubular pipe co-axially extending therethrough from end to end, and open at each end to the outside air, transverse partitions forming a plurality of annular compartments in said drum, a fine mesh wire netting covering the perforations outside said pipe, a similar netting on the inside of the drum and covering the perforations therein, a plurality of flanged trackways secured at spaced intervals to the exterior of said drum, a base portion adjacent each trackway and having rollers engaging the trackway to rollably support the drum, the ends of the drum being free from trunnions or the like, the rollers of each base being spaced apart a substantial distance to insure stability of the drum thereon, the outer wall of the drum having an outwardly inclined hopper communicating with each compartment to permit charging of the compartment when turned up, and to discharge the same into a bag or the like when down, and means to accelerate the movement of air through said tubular pipe, said apparatus serving to store and maintain grain or the like in a dry condition for long periods of time but readily available when desired.

12. A drying and storage apparatus comprising a receptacle having inner and outer walls forming a storage and drying chamber between said walls, hoppers on said outer wall and being operable to permit entry of grain into said chamber when said hoppers are in a charging position and to direct the discharge of grain from said chamber when said hoppers are in a discharging position.

13. A drying and storage apparatus comprising a receptacle having inner and outer walls forming a storage and drying chamber between said walls, said outer wall having an opening and common means provided with a passage carried by said outer wall at said opening and operating to permit entry of grain into said chamber when in one position and discharge of grain from said chamber when in another position, and means for forcing a drying medium through said chamber for drying the grain therein.

In witness whereof, I hereunto subscribe my name to this specification.

CHARLES E. JOHNSON